(12) United States Patent
Baccouche et al.

(10) Patent No.: US 7,066,508 B1
(45) Date of Patent: Jun. 27, 2006

(54) BUMPER CROSS-SECTION WITH HINGES

(75) Inventors: Ridha Baccouche, Ann Arbor, MI (US); Hikmat Mahmood, Bloomfield Hills, MI (US); Chelliah Madasamy, Canton, MI (US); David Wagner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/095,357

(22) Filed: Mar. 31, 2005

(51) Int. Cl.
*B60R 19/18* (2006.01)

(52) U.S. Cl. ............... 293/120; 293/122; 293/133

(58) Field of Classification Search ........... 293/120, 293/121, 122, 102, 132, 133; 188/371, 377
See application file for complete search history.

(56) References Cited

U.S. PATENT DOCUMENTS

| | | | | |
|---|---|---|---|---|
| 3,938,841 A | * | 2/1976 | Glance et al. ............ 293/120 |
| 4,940,270 A | * | 7/1990 | Yamazaki et al. ......... 293/122 |
| 5,997,058 A | | 12/1999 | Pedersen | |
| 6,000,738 A | * | 12/1999 | Stewart et al. ............ 293/102 |
| 6,042,163 A | | 3/2000 | Reiffer | |
| 6,349,521 B1 | * | 2/2002 | McKeon et al. .......... 52/735.1 |
| 6,360,441 B1 | * | 3/2002 | Himsl et al. ............. 29/897.2 |
| 6,485,072 B1 | * | 11/2002 | Werner et al. ............ 293/132 |
| 6,513,860 B1 | | 2/2003 | Ourchane | |
| 6,575,510 B1 | * | 6/2003 | Weissenborn ............ 293/121 |
| 6,644,701 B1 | * | 11/2003 | Weissenborn et al. ..... 293/120 |
| 6,684,505 B1 | * | 2/2004 | Sundgren et al. ........ 29/897.2 |
| 6,877,785 B1 | * | 4/2005 | Evans et al. .............. 293/120 |
| 6,923,482 B1 | * | 8/2005 | Cumming et al. ........ 293/102 |
| 2002/0053805 A1 | | 5/2002 | Azuchi | |

\* cited by examiner

*Primary Examiner*—D. Glenn Dayoan
*Assistant Examiner*—Greg Blankenship
(74) *Attorney, Agent, or Firm*—Gigette M. Bejin; Miller Lawgroup, PLLC

(57) ABSTRACT

A bumper beam is formed from a tailor welded blank with thinner gage sheet metal laser welded to thicker gage sheet metal at opposing sides thereof. The tailor welded blank is then formed into a bumper beam having a uniform B-shaped cross-sectional configuration from one terminal end to the other. Each fore-and-aft extending wall of each cell of the B-shaped cross-sectional configuration is formed with first and second hinges at a bend line between substantially horizontal portions of the wall and an intermediate transitional portion such that the horizontal portions are at different vertically spaced positions. Upon receipt of an impact, the first hinges bend into the corresponding cell while the second hinges bend outwardly. The second hinges on the corresponding inner walls of the two cells contacting upon deep collapse to enhance energy absorption.

18 Claims, 6 Drawing Sheets

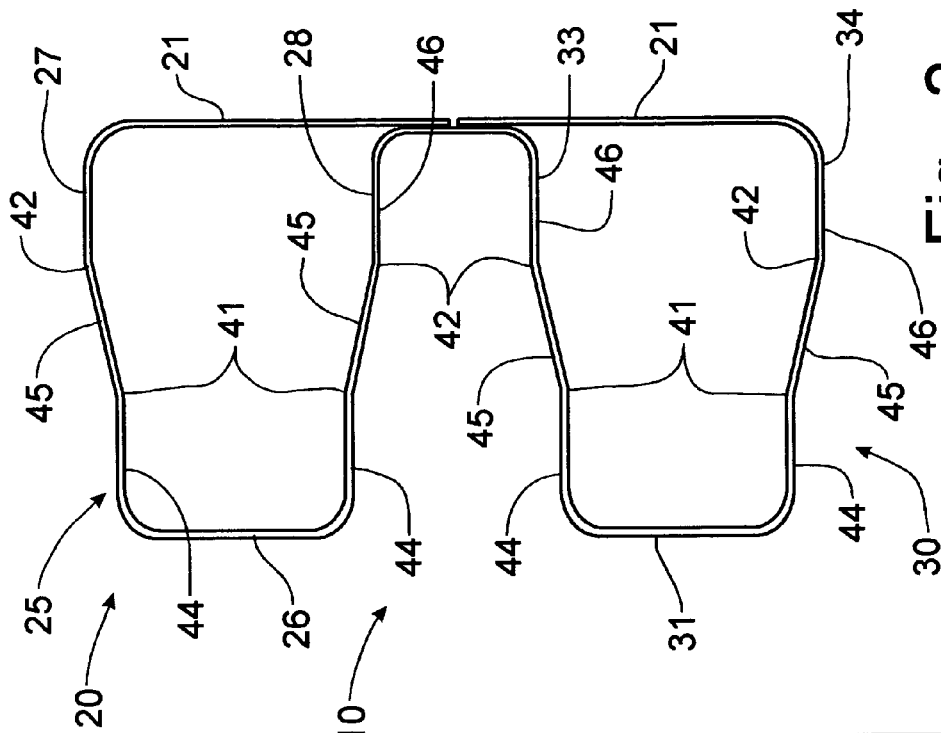

BUMPER CROSS-SECTION WITH HINGES

FIELD OF THE INVENTION

This invention relates to a bumper for an automotive vehicle and, more particularly, to a lightweight bumper that provides crash performance equivalent to conventional bumper configurations.

BACKGROUND OF THE INVENTION

Bumpers are mounted at the forward extremity of a vehicle to protect the chassis of the vehicle from minor impacts. The bumper is mounted to the lower frame rails of the vehicle chassis for support thereof and functions to withstand minor impacts by collapsing to absorb the energy encountered through the impact.

The structure of a bumper can be formed in a "B-shaped" configuration with a front face flange and upper and lower cells. This B-shaped structural configuration can be seen in U.S. Pat. No. 6,042,163, issued to Raymond Reiffer on Mar. 28, 2000. The Reiffer patent discloses a bumper having a primary central member shaped in the "B" configuration with end pieces welded to the primary central member after formation to provide the ability to mount the bumper to the frame rails. A similar cross-sectional configuration is found in U.S. Pat. No. 6,684,505, issued on Feb. 3, 2004, to Anders Sundgren, et al. The Sundgren bumper is formed through a roll forming process from a uniform piece of sheet metal to create a thicker cross-section in the central portion than on the ends to facilitate the attachment of the bumper to the frame rails.

U.S. Patent Application Publication No. 2002/0053805, filed by Kazunari Azuchi, et al and published on May 9, 2002, is also directed to a B-shaped bumper configuration that absorbs impact through deformation of the upper and lower cells. The Azuchi bumper is formed with a central reinforcement section and connection sections at the terminal ends for connecting to the lower frame rails. The hollow central section includes a groove of varying depths to define the "B" configuration; however, the shape of the cross-section does not remain uniform along the length of the bumper. In fact, the groove separating the upper and lower cells of the B-shaped cross-section is reversed at the terminal ends in one embodiment to position the groove forwardly instead of rearwardly as formed in the central section.

Not all bumpers are formed in the B-shaped structural configuration, as is depicted in U.S. Pat. No. 5,997,058, issued to Roald Pedersen on Dec. 7, 1999. The Pedersen bumper is formed as a single cell hollow tube that has varying cross-section shapes along the longitudinal length of the bumper. The cross-sectional shape changes to provide a desired resilient effect for the bumper and to provide different energy absorption qualities along the longitudinal length of the bumper.

For conventional bumpers, enhancements to the cross-sectional configuration in the form of reinforcement inserts provide higher energy absorption qualities for those reinforced areas of the bumper, thus obtaining the desired variations in the collapsing of the bumper structure. Such reinforcements are conventionally placed at the attachment points between the bumper structure and the lower frame rails to allow for a greater absorption and dispersion of impact energy by the bumper before being transferred to the lower frame rail into the vehicle chassis.

Because, as will be described in greater detail below, the bumper incorporating the principles of the instant invention utilizes a tailor welded blank in the formation of the bumper configuration, U.S. Pat. No. 6,513,860, issued to Amar Ourchane, et al on Feb. 4, 2003, and owed by the Assignee of the instant application, is cited as a general teaching of an automotive component formed from a tailor welded blank in which portions of the sheet metal blank are initially formed with different material thicknesses and laser welded together to form a single blank from which the component is then formed, resulting in different thickness gages at different parts of the component.

It would be desirable to provide a lightweight bumper configuration that would be capable of crash performance characteristics of heavier conventional bumpers that are formed with reinforcement inserts. Designing the shape of the cells in the B-shaped cross-sectional configuration of the bumper to collapse in a prescribed manner can enhance crash performance and provide equivalent energy management of a significantly heavier conventional bumper.

SUMMARY OF THE INVENTION

It is an object of this invention to overcome the aforementioned disadvantages of the known prior art by providing a lightweight bumper structure that has an equivalent energy management comparable to a heavier conventional bumper profile.

It is another object of this invention to provide a bumper structure that does not require reinforcement inserts to enhance crash performance.

It is a feature of this invention that the cross-sectional configuration of the bumper structure is formed with shaped upper and lower cells that collapse in a predetermined manner to provide an effective energy management characteristic upon impact.

It is another feature of this invention that each cell of the bumper cross-section is formed with inner and outer walls that have a pair of plastic hinges to control the predetermined collapse of the bumper cells.

It is an advantage of this invention that the cross-sectional configuration of the bumper beam can be uniformly manufactured along the entire length of the bumper beam.

It is still another feature of this invention that the inner walls of the bumper beam cells include a second hinge that direct the collapse of the cells in a manner that the second hinges become contact points upon a deep collapse of the cells.

It is still another advantage of this invention that the plastic hinges of the inner and outer walls of the bumper beam cells are formed by a bending of the walls to form forward and rear generally horizontal portions located at different vertical positions with an angled transition portion extending therebetween.

It is a further advantage of this invention that the design of the bumper beam is required to utilize heavy material thickness only at the locations where such material thickness is needed without requiring the utilization of reinforcement inserts.

It is yet another object of this invention to provide a bumper beam cross-sectional configuration that incorporates first and second plastic hinges to direct the collapse of the bumper beam cells in a prescribed manner for effective energy management by the bumper beam.

It is a further object of this invention to provide a lightweight bumper beam that is durable in construction, inexpensive of manufacture, facile in assemblage, and simple and effective in use.

These and other objects, features and advantages are accomplished according to the instant invention by providing a bumper beam that is formed from a tailor welded blank with thinner gage sheet metal laser welded to thicker gage sheet metal at opposing sides thereof. The tailor welded blank is then formed into a bumper beam having a uniform B-shaped cross-sectional configuration from one terminal end to the other. Each fore-and-aft extending wall of each cell of the B-shaped cross-sectional configuration is formed with first and second hinges at a bend line between substantially horizontal portions of the wall and an intermediate transitional portion such that the horizontal portions are at different vertically spaced positions. Upon receipt of an impact, the first hinges bend into the corresponding cell while the second hinges bend outwardly. The second hinges on the corresponding inner walls of the two cells contacting upon deep collapse to enhance energy absorption.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a right front perspective view of a bumper beam incorporating the principles of the instant invention;

FIG. 2 is an end view of the bumper beam depicted in FIG. 1 to reflect the B-shaped cross-sectional configuration of the bumper beam;

FIG. 3 is a plan view of the tailor welded blank used to manufacture the bumper beam;

DETAILED DESCRIPTION OF THE PREFERRED EMBODIMENT

Referring to FIGS. 1–4, a bumper beam formed according to the principles of the instant invention, to be mounted on the lower frame rails at a forward location of an automobile frame, can best be seen.

Figure 4:
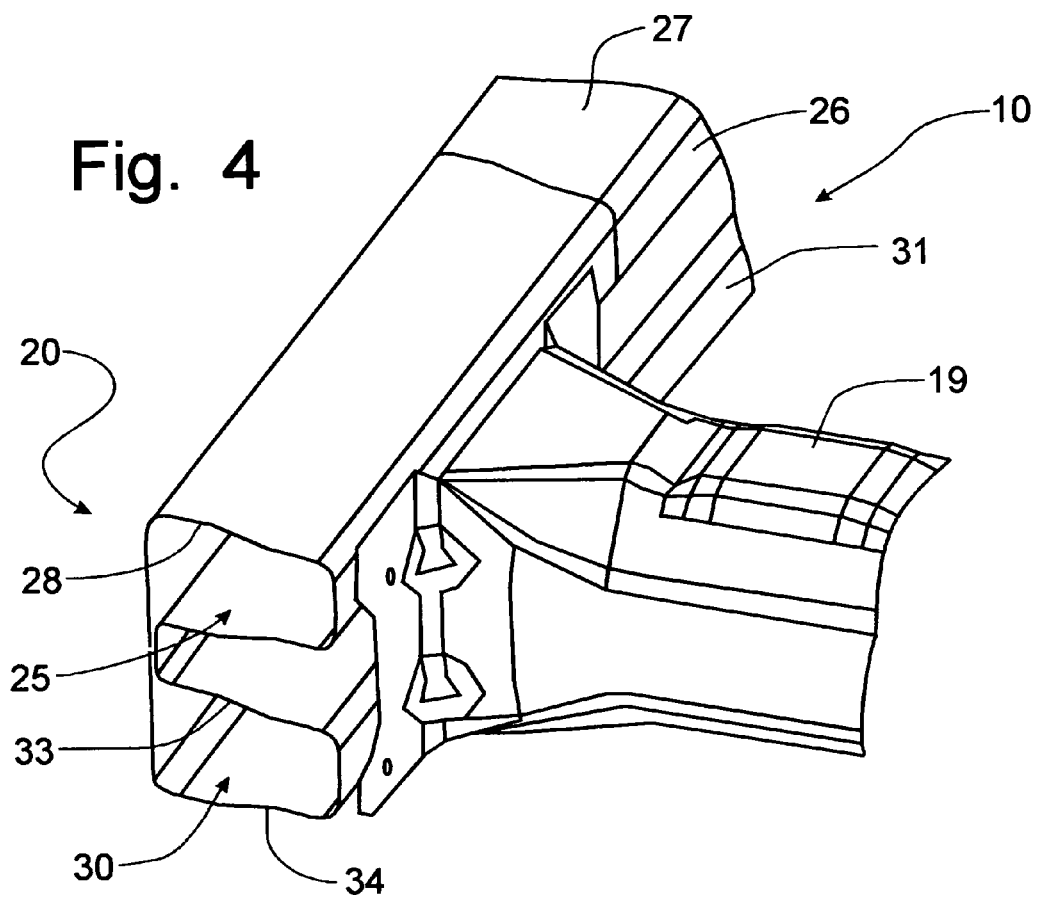
FIG. 4 is a partial left rear perspective view of the bumper beam attached to the corresponding lower frame rail of the vehicle chassis.

The bumper beam 10 is formed from a tailor welded blank 15, depicted in FIG. 3, with a 0.7 mm gage central piece of sheet metal 16 and with 1.3 mm gage sheet metal pieces 18 laser welded to the opposing lateral edges 17 of the central piece 16 to provide a single sheet metal blank 15 from which the bumper beam 10 is to be formed. The central piece of sheet metal 16 corresponds to the center portion 12 of the bumper beam 10, while the side pieces 18 of the blank 15 correspond to the respective terminal ends 14 of the bumper beam where the lower frame rails 19 are affixed, as is depicted in FIG. 4. Preferably, the central and side pieces 16, 18 of the tailor welded blank 15 are constructed from ultra high strength steel commonly referred to as M220 Martinsite steel.

The blank 15 is then stamped into the desired B-shaped configuration, which will be described in greater detail below, to provide a bumper beam 10 having a uniform cross-sectional configuration, as is depicted in FIG. 2, along the entire longitudinal length of the beam 10. The central portion 12 has the thinner gage sheet metal to provide effective energy absorbing characteristics while the heavier gage sheet metal is formed at the terminal ends 14 of the beam 10 requires greater energy absorption due to the mounting of the beam 10 to the lower frame rails 19. Thus, the bumper beam 10 utilizes material thickness only where increased material thickness is needed, i.e. at the frame rail 19 mounting locations, without requiring the use of reinforcement inserts that increased the number of parts and the complexity required to manufacture a bumper beam.

Accordingly, the utilization of a tailor welded blank 15 provides variable material thicknesses along the longitudinal length of the bumper beam 10 to provide different crash conditions and load applications as desired, irrespective of the cross-sectional configuration into which the bumper beam 10 is formed. The weight savings in the center section 12 of the beam 10, while providing greater material thickness at the terminal ends 14, results in a substantial reduction in manufacturing costs without sacrificing crash performance and without requiring additional parts for reinforcement.

Figure 5:
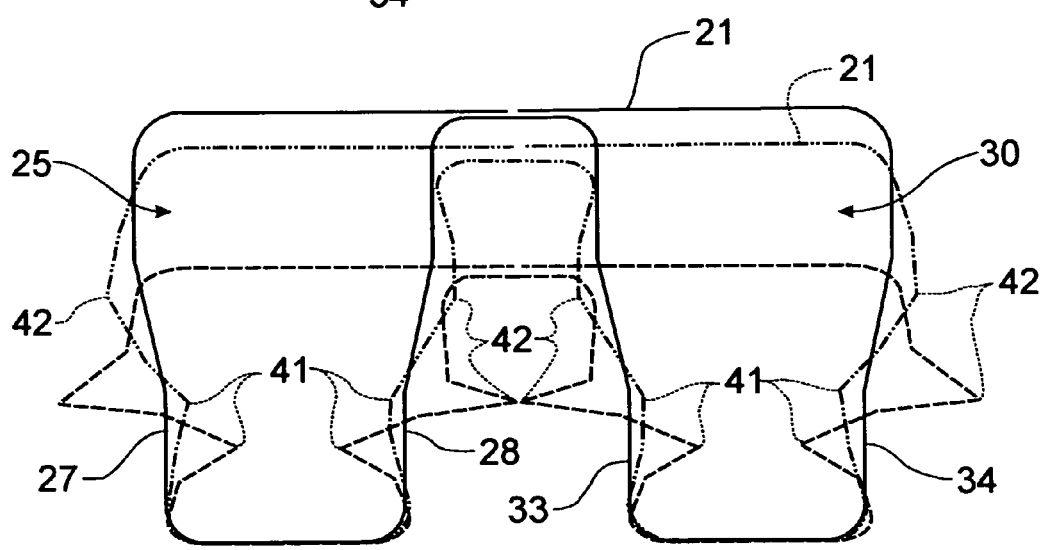
FIG. 5 is an end view of the bumper beam corresponding to that shown in FIG. 2, but having a first deformed shape superimposed in phantom to depict the deformation pattern designed into the cross-sectional configuration along the length of the bumper beam and a second deformed shape superimposed in dashed lines to depict the configuration in a deep collapse situation.

The cross-sectional configuration of the bumper beam 10 formed according to the principles of the instant invention is best seen in FIGS. 2 and 5. The tailor welded blank 15 is placed into a tool (not shown) and stamped into a B-shaped structural configuration 20. The B-shaped configuration 20 defines a front face flange 21 and upper and lower cells 25, 30 which are essentially mirror images of one another when viewed with respect to a generally horizontal longitudinally extending centerline. The upper cell 25 is formed with the front face flange 21, an opposing rear wall 26, an outer wall 27 and an inner wall 28. Similarly, the lower cell 30 is defined with the front face flange 21, the opposing rear wall 31, the inner wall 33, which opposes the inner wall 28 of the upper cell 25, and the outer wall 34.

Each of the outer and inner walls 27, 28, 33, 34 is formed with first and second plastic hinges 41, 42 to control the collapse configuration of the cross-section 20. The first plastic hinge 41 is formed by a bend in the wall 27, 28, 33, 34 between a rear horizontal portion 44 and an angled transition portion 45. The second plastic hinge 42 is formed by a bend in the wall 27, 28, 33, 34 between the transition portion 45 and a forward horizontal portion 46. The plastic hinges 41, 42 can be enhanced by thinning the thickness of the sheet metal slightly at the bend between the respective portions 44, 45, and 46 of the walls 27, 28, 33, 34, but merely creating the angled transition portion 45 between generally horizontal portions 44, 46 that have slightly different vertical positions on the cell 25, 30, as is depicted in FIG. 2, is sufficient to effect the desired bending of the cells 25, 30 during impact to absorb energy in a controlled manner.

Accordingly, the outer wall 27 of the upper cell 25 has the forward portion 46 at the highest vertical position with the rear portion 44 being slightly lower vertically having the transition portion 45 interconnecting the forward and rear portions 44, 46. The inner wall 28 of the upper cell 25 is formed oppositely, with the forward portion 46 being lower vertically than the rear portion 44. The lower cell 30 is the mirror image with the inner wall 33 being formed like the outer wall 27 of the upper cell 25, and the outer wall 34 being formed like the inner wall 28 of the upper cell 25.

With the rear walls 26, 31 oriented generally parallel to the front face 21 and being attached to the lower frame rail 19, an impact received against the front face flange 21 causes the cells 25, 30 to collapse in a planned, prescribed manner, as is demonstrated in FIG. 5. The first hinges 41 buckled inwardly (with respect to the corresponding cell 25, 30) while the second hinges 42 buckle outwardly with respect to each corresponding cell 25, 30. The two second hinges 42 on the inner walls 28, 33 come into contact with one another upon a substantial impact received by the front face 21 and a resulting deep collapse of the cells 25, 30 to provide support at the inner wall surfaces upon deep collapse to establish an enhanced crash performance.

Figure 6:
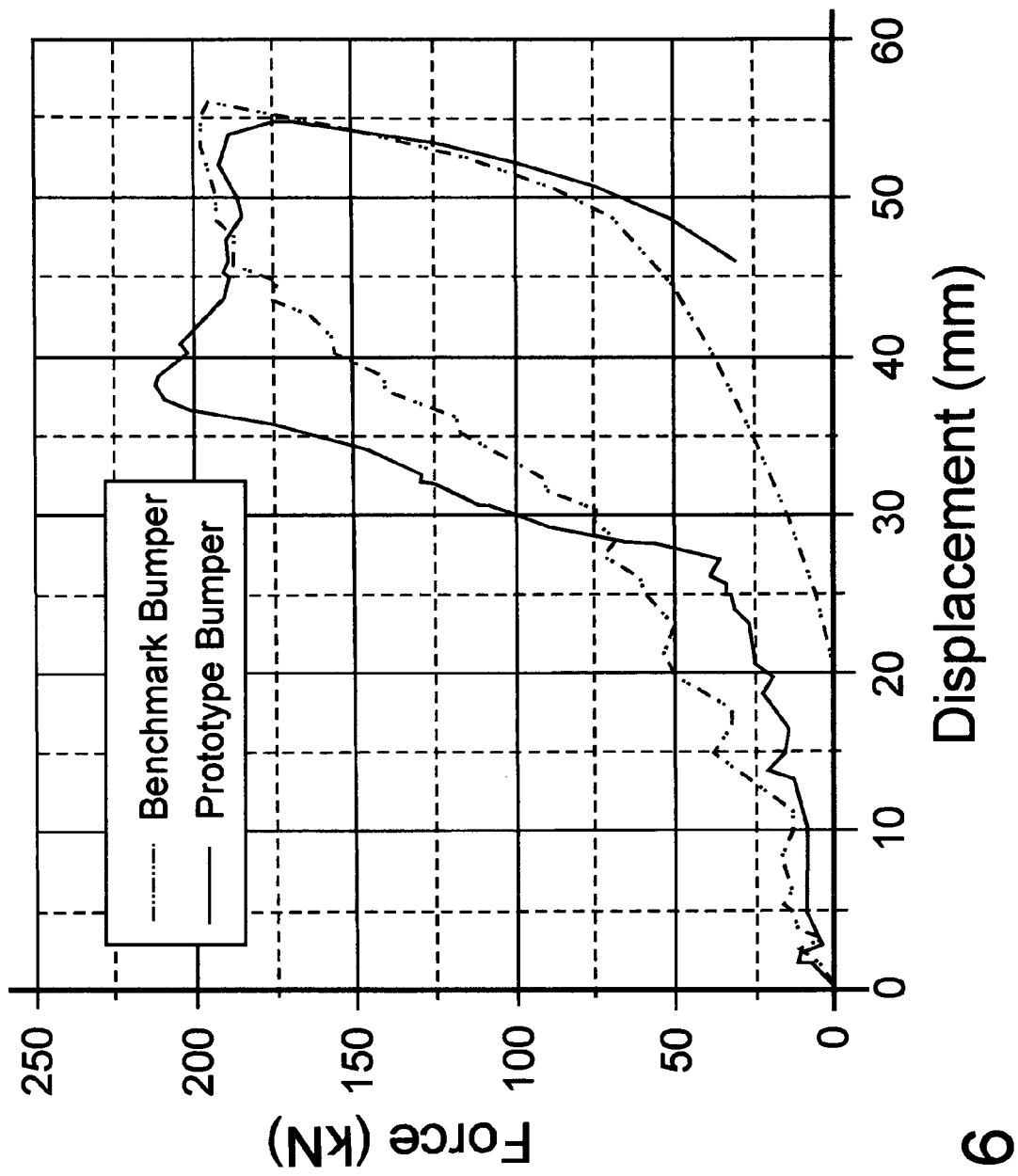
FIG. 6 is a graph representing the displacement of the bumper beam section as a function of the force required to effect the deformation under low speed (5 mph) conditions, the bumper beam incorporating the principles of the instant invention being plotted in solid lines while a benchmark bumper beam is plotted in phantom lines.
Figure 7:
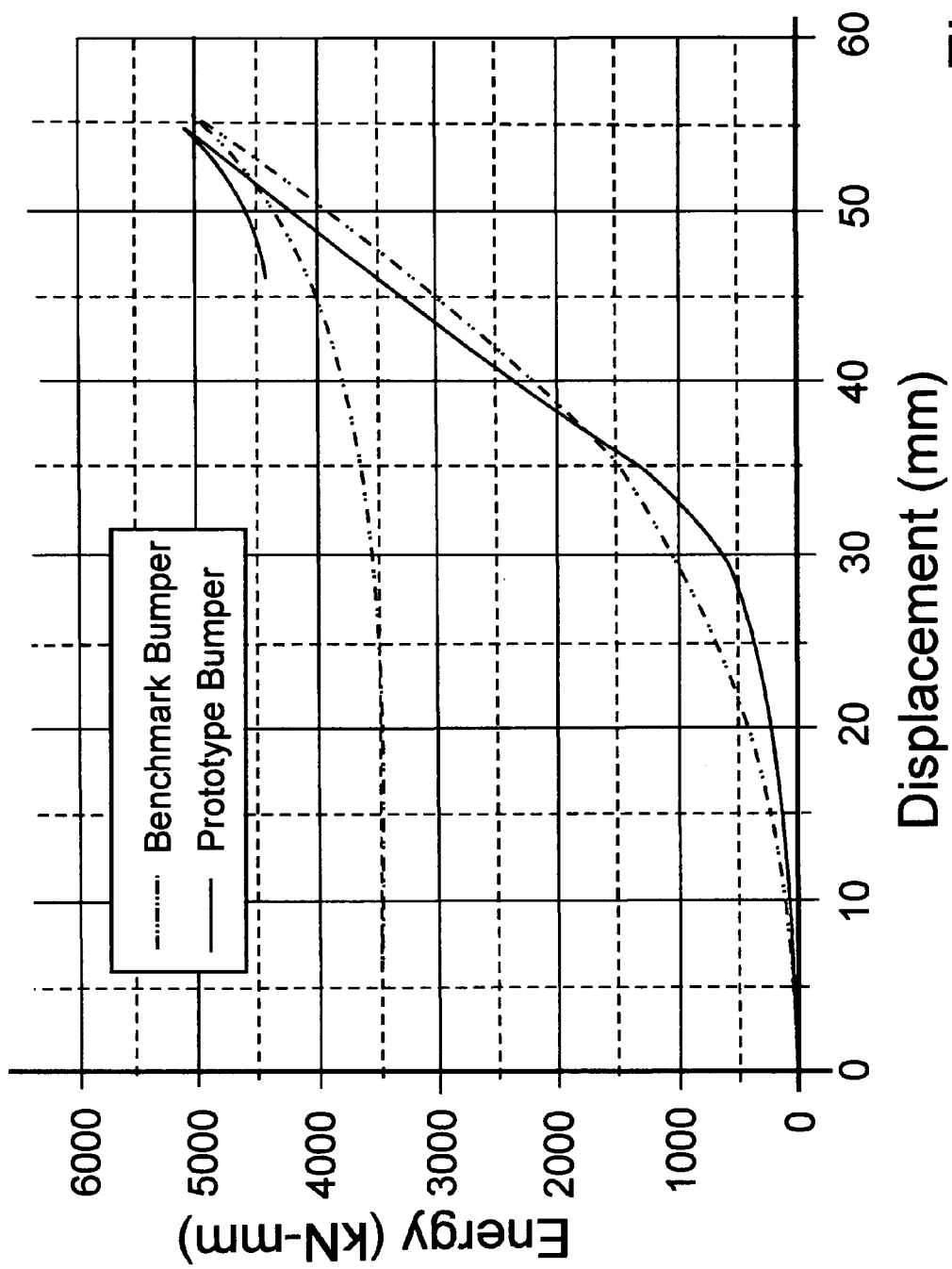
FIG. 7 is a graph representing the displacement of the bumper beam section as a function of the energy absorbed to effect the deformation under low speed (5 mph) conditions, the bumper beam incorporating the principles of the instant invention being plotted in solid lines while a benchmark bumper beam is plotted in phantom lines.

The crash performance of the bumper 10 is demonstrated at low speed (5 mph) impact in FIG. 6. The performance of the bumper 10 is plotted in solid lines against the performance of a conventional benchmark bumper, which is plotted in phantom lines. As one of ordinary skill in the art will recognize, the bumper 10 formed in accordance with the principles of the instant invention had a better crash response than the benchmark bumper that weighed 4.2 pounds more than the bumper 10. As can be seen in FIG. 7, the energy management of the bumper 10 was substantially the same as the benchmark bumper even though the bumper 10 was 4.2 pounds lighter than the conventional benchmark bumper.

Figure 8:
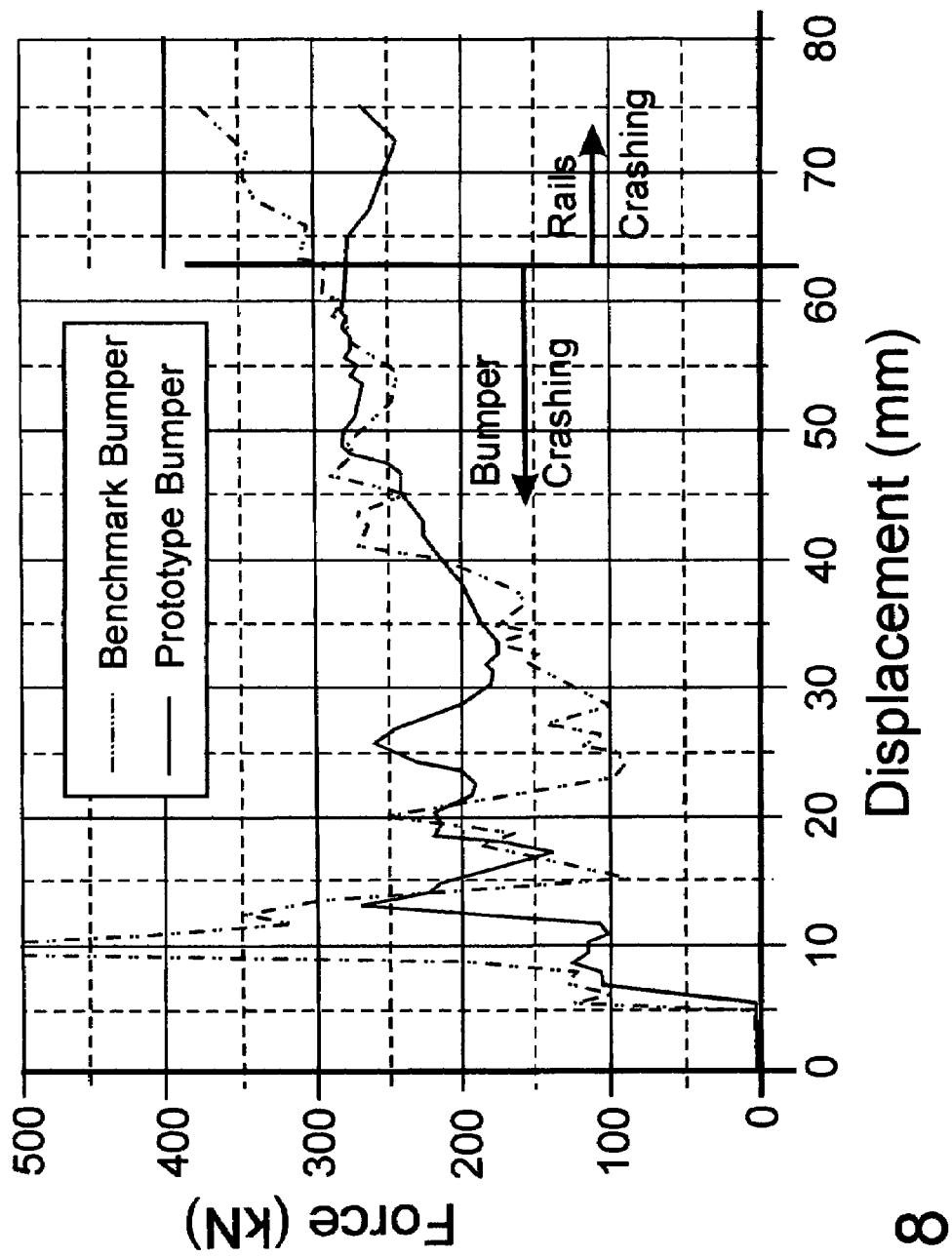
FIG. 8 is a graph representing the displacement of the bumper beam section as a function of the force required to effect the deformation under high speed (35 mph) conditions, the bumper beam incorporating the principles of the instant invention being plotted in solid lines while a benchmark bumper beam is plotted in phantom lines.
Figure 9:
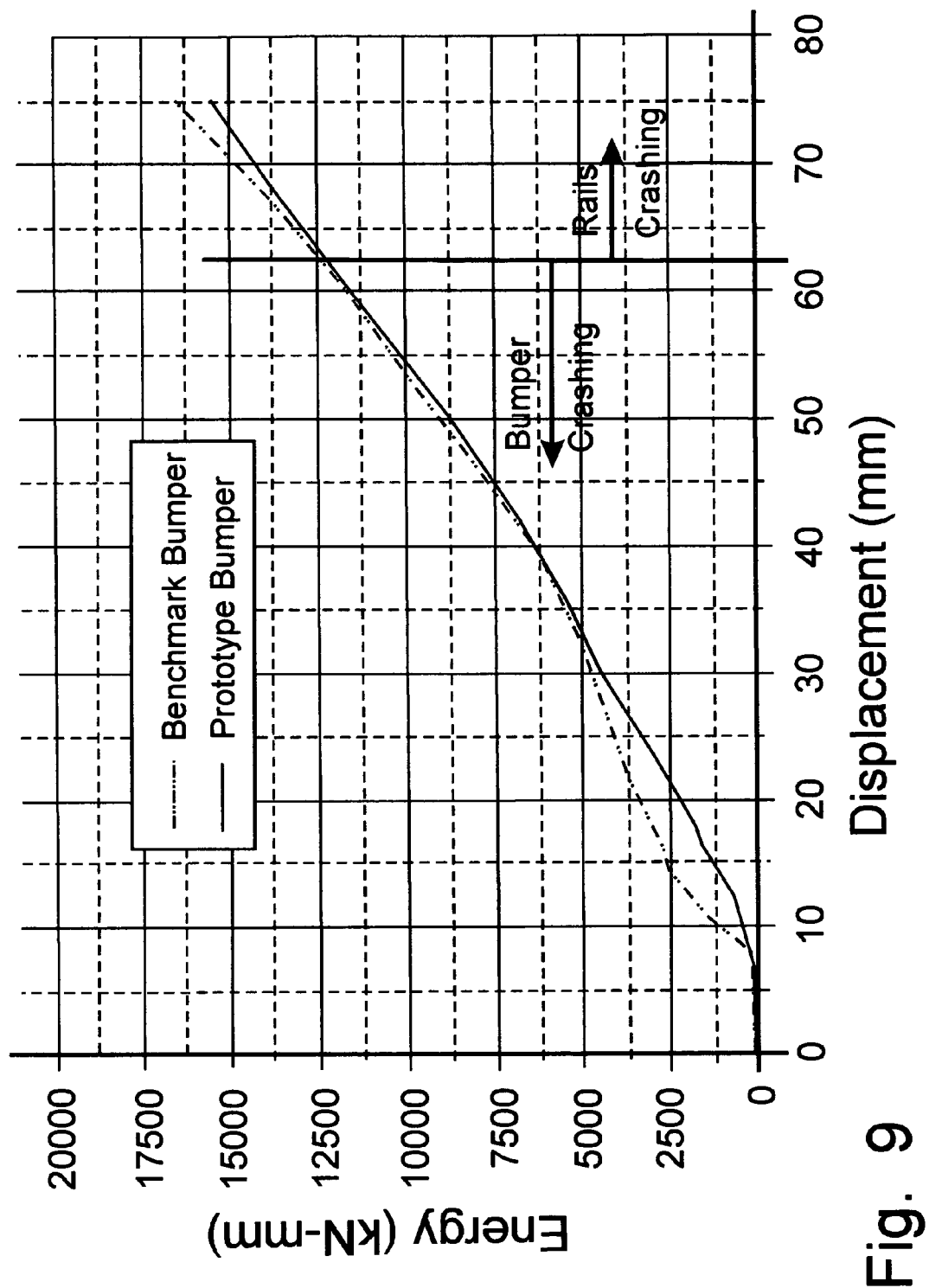
FIG. 9 is a graph representing the displacement of the bumper beam section as a function of the energy absorbed to effect the deformation under high speed (35 mph) conditions, the bumper beam incorporating the principles of the instant invention being plotted in solid lines while a benchmark bumper beam is plotted in phantom lines.

Similar results were obtained in high speed (35 mph) crash tests. In FIG. 8, the crash response of the bumper 10 built in accordance with the principles of the instant invention was significantly better with a lower first peak than the conventional benchmark bumper through the 62.5 mm displacement of the bumper structure 10. As can be seen in FIG. 9, the energy management of the bumper 10 is substantially the same as was obtained in test results of the conventional benchmark bumper, though the bumper 10 was 4.2 pounds lighter in weight than the benchmark bumper.

Accordingly, the combination of the variable material thickness along the longitudinal length of the bumper beam 10 with the specific dual hinged cell walls 27, 28, 33, 34 of the bumper cross-sectional configuration 20, provides a lightweight bumper structure 10 that outperforms a heavier conventional benchmark bumper with the same energy management. The lighter overall weight of the bumper 10 provides material savings that reduce the overall cost of manufacturing a bumper 10 for an automotive chassis.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A bumper beam for mounting on an automotive chassis comprising:
a B-shaped cross-sectional configuration including a front face and a pair of vertically spaced cells, each said cell being defined by said front face, an opposing rear wall, an outer wall spanning between said rear wall and said front face, and an inner wall opposite said outer wall, each of said inner and outer walls of each cell having a first hinge and a second hinge to cause said inner and outer walls, respectively, to buckle upon impact in a predetermined manner to enhance energy management of the bumper beam.

2. The bumper beam of claim 1 wherein said first hinge on each said inner wall is formed as a bend line between a generally horizontal rear portion of said inner wall, and an angled transition portion of said inner wall.

3. The bumper beam of claim 2 wherein said second hinge on each said inner wall is formed by a bend line between a generally horizontal front portion of said inner wall and said angled transition portion.

4. The bumper beam of claim 3 wherein said first hinge buckles inwardly into the corresponding said cell while the second said hinge buckles outwardly away from the corresponding said cell.

5. The bumper beam of claim 4 wherein said inner walls of said cells are arranged so that the respective said second hinges buckle toward the opposing cell to provide a deep collapse contact between said two cells.

6. The bumper beam of claim 5 wherein said bumper beam is formed from a tailor welded blank having a central piece of sheet metal with a material thickness less than a corresponding material thickness of side pieces of sheet metal welded to lateral edges of said central piece of sheet metal, said central piece of sheet metal corresponding to a central section of said bumper beam and said side pieces of sheet metal corresponding to terminal end sections of said bumper beam.

7. The bumper beam of claim 6 wherein said B-shaped cross-sectional configuration of said bumper beam is substantially uniform along said bumper beam from one terminal end section to the other.

8. A bumper beam for mounting on an automotive chassis comprising:
a B-shaped cross-sectional configuration including a front face and a pair of vertically spaced cells, each said cell being defined by said front face, an opposing rear wall, an outer wall spanning between said rear wall and said front face, and an inner wall opposite said outer wall, each of said inner walls having a pair of first and second hinges to cause said inner walls to buckle upon impact in a predetermined manner with each of said first hinges buckling inwardly with respect to the corresponding said cell and each of said second hinges buckling outwardly with respect to the corresponding said cell toward the said second hinge of the opposing said cell, each of said second hinges contacting one another upon deep collapse of said cells to provide support for each respective said second hinge and, thereby, enhance energy management of the bumper beam.

9. The bumper beam of claim 8 wherein said outer walls of said cells also are formed with first and second hinges with said first hinges buckling inwardly with respect to the corresponding said cell and said second hinges buckling outwardly with respect to the corresponding said cell.

10. The bumper beam of claim 9 wherein each said first hinge is formed as a bend line between a generally horizontal rear portion of the corresponding said wall, and an angled transition portion of said corresponding wall.

11. The bumper beam of claim 10 wherein each said second hinge is formed by a bend line between a generally horizontal front portion of the corresponding said wall and the corresponding said angled transition portion.

12. The bumper beam of claim 11 wherein a vertical distance between corresponding front portions of the inner and outer walls of one of said cells is greater than a corresponding vertical distance between corresponding rear portions of said inner and outer walls of said cell.

13. The bumper beam of claim 12 wherein said B-shaped cross-sectional configuration is substantially uniform along said bumper beam.

14. In a bumper beam for mounting on an automotive chassis comprising:
   a B-shaped cross-sectional configuration including a front face and a pair of vertically spaced opposing cells, each said cell being defined by said front face, an opposing rear wall, an outer wall spanning between said rear wall and said front face, and an inner wall opposite said outer wall, each of said inner and outer walls having a first hinge and a second hinge to cause said inner and outer walls to buckle upon impact in a predetermined manner with each of said first hinges buckling inwardly with respect to the corresponding said cell and each of said second hinges buckling outwardly with respect to the corresponding said cell, the second hinge of each of said inner walls being directed toward the second hinge on the opposing said inner wall such that said second hinges contact one another upon deep collapse of said cells to provide support for each respective said second hinge and, thereby, enhance energy management of the bumper beam.

15. The bumper beam of claim 14 wherein each said first hinge is formed as a bend line between a generally horizontal rear portion of the corresponding said wall, and an angled transition portion of the corresponding said wall.

16. The bumper beam of claim 14 wherein each said second hinge is formed by a bend line between a generally horizontal front portion of the corresponding said wall and the corresponding said angled transition portion.

17. The bumper beam of claim 16 wherein a vertical distance between corresponding front portions of the inner and outer walls of one of said cells is greater than a corresponding vertical distance between corresponding rear portions of said inner and outer walls of said cell.

18. The bumper beam of claim 17 wherein said B-shaped cross-sectional configuration is substantially uniform along said bumper beam.

* * * * *